(12) United States Patent
Hunckler et al.

(10) Patent No.: US 10,780,734 B2
(45) Date of Patent: Sep. 22, 2020

(54) TIRE SIDEWALL SHADING DEVICE AND ATTACHMENT SYSTEM

(71) Applicants: Roger V. Hunckler, Mocksville, NC (US); Clare A. Hunckler, Mocksville, NC (US)

(72) Inventors: Roger V. Hunckler, Mocksville, NC (US); Clare A. Hunckler, Mocksville, NC (US)

( * ) Notice: Subject to any disclaimer, the term of this patent is extended or adjusted under 35 U.S.C. 154(b) by 148 days.

(21) Appl. No.: 16/008,229

(22) Filed: Jun. 14, 2018

(65) Prior Publication Data
US 2019/0381824 A1 Dec. 19, 2019

(51) Int. Cl.
*B60B 7/01* (2006.01)
*B60B 7/06* (2006.01)
*B60B 7/00* (2006.01)

(52) U.S. Cl.
CPC .............. *B60B 7/01* (2013.01); *B60B 7/0046* (2013.01); *B60B 7/0093* (2013.01); *B60B 7/061* (2013.01)

(58) Field of Classification Search
CPC ........... B60B 7/00; B60B 7/01; B60B 7/0046; B60B 7/0093; B60B 7/061; B60B 7/06
See application file for complete search history.

(56) References Cited

U.S. PATENT DOCUMENTS

| | | | | | |
|---|---|---|---|---|---|
| 1,557,943 | A | * | 10/1925 | Musto | B62D 43/00 206/304.1 |
| 1,991,207 | A | * | 2/1935 | Hartel | B62D 43/005 206/304.2 |
| 2,747,639 | A | * | 5/1956 | Mertz | B60C 27/12 152/173 |
| 2,989,345 | A | * | 6/1961 | Lyon | B60B 7/08 301/37.39 |
| 3,313,501 | A | * | 4/1967 | Williams | B64C 29/0091 244/103 R |
| 4,836,615 | A | * | 6/1989 | Berg | B60B 7/0006 301/37.109 |
| 2003/0201665 | A1 | * | 10/2003 | Kenion | B60B 7/01 301/37.103 |
| 2005/0194774 | A1 | * | 9/2005 | Romano | B60B 7/00 280/762 |
| 2005/0264092 | A1 | * | 12/2005 | Garrett | B60J 11/10 301/37.42 |
| 2008/0230576 | A1 | * | 9/2008 | Arabadjis | B62D 43/005 224/42.2 |
| 2012/0212035 | A1 | * | 8/2012 | Fleck | B60B 7/10 301/37.31 |

* cited by examiner

*Primary Examiner* — Christopher R Harmon
(74) *Attorney, Agent, or Firm* — The Rapacke Law Group, P.A.

(57) ABSTRACT

A shading system for tires and wheels being built to a customized shape and size to cover at minimum the sidewall of a tire. The shading system may be comprised of, but is not limited to, multiple layers of shading material offering ultraviolet and heat protection for the covered area and a multipoint harness to secure the shade to the tire.

22 Claims, 5 Drawing Sheets

TIRE SIDEWALL SHADING DEVICE AND ATTACHMENT SYSTEM

FIELD OF THE INVENTION

The present invention relates to a shade, an attachment system for the shade, and to the method of making and using the shade.

BACKGROUND OF THE INVENTION

Tire shades have been used to block a certain amount of ultraviolet degradation of tire rubber since the issue of sidewall dry-rot was first noticed. Multiple solutions have been devised over the years, each of these attempts has had significant drawbacks. A new tire sidewall shade system is needed to overcome these known disadvantages. What follows is a description of the current available designs and a brief statement of how our Tire Sidewall Shades overcomes their existing shortcomings:
- Vinyl Bag Type Tire Covers: This is the most common tire cover. These are a "universal fit" cover that is commonly found in discount and RV stores. This style of tire cover covers the tread as well as the sidewall and rim. They are difficult to install and must be tied on the back side of the tire to hold them in place. Issues with this type of tire cover are as follows:
1. Universal design does not fit well, aesthetically not pleasing.
    - Tire Sidewall Shades are custom fitted to the tire size with fabric under tension.
2. Moisture is trapped on the tire and within the cover. This is not good for the tire or rim, and it also creates a habitat for vermin, spiders, snakes, scorpions etc.
    - Tire Sidewall Shades allow air flow around tire and rim, no damp dark area created for vermin.
3. Very hard to install on a large tire i.e.: a motorhome tire.
    - Tire Sidewall Shades are easier to install by virtue of the UV shock cord eliminating buckles
4. Usually made from inexpensive vinyl which will deteriorate within a 3-year period depending on the geographical location where the cover is used.
    - Tire Sidewall Shades are fabricated from a Marine Fabric, typically Acrylic coated, rated for long-term outdoor use.
5. The lining fabric will hold moisture promoting mold
    - Tire Sidewall Shades are not lined and are also mold and mildew resistant, will not absorb moisture.
    - FENDER MOUNTED TIRE SHADES: Fender mounted tire shades are basically a square or rectangular shaped fabric that is attached to the fender of the RV by a method of snaps or twist locks. The shade drapes the open wheel well shading the tire. Issues of this design are as follows:
1. Snaps or twist locks are used to fasten this type of shade to the fender which requires drilling holes into the fender to fasten the twist locks or snaps.
    - Tire Sidewall Shades do not attach to the fender, requires no installation hardware
2. The fender mounted shade can scratch the paint surface
    - Tire Sidewall Shades are attached to the tire sidewall, no possibility of paint damage.
3. The fender mounted shade can expose the lower part of the tire to the sun if the front of the motorhome is raised in order to level it
    - Tire Sidewall Shades stay on the tire, regardless of how a unit is leveled, so that the shade function is unaffected
4. Storage is also an issue with this type of shade product
    - Tire Sidewall Shades twist and fold to approximately ⅓ the size of the tire and store flat, requiring very little storage space
    - TRACK MOUNTED TIRE SHADES: A track that is fastened to the inside of the fender held by screws or rivets driven into the metal, a shade is then slide into that track inside the fender.
1. Track mounted tire shades are typically very expensive up to 5 times the cost of a vinyl shade.
    - Tire Sidewall Shades are less expensive
2. Like the fender mounted shade, the lower part of the tire may be exposed to sun if the motorhome is raised high in order to level
    - Tire Sidewall Shades stay on the tire, regardless of how a unit is leveled the shade function is unaffected
3. The track that the shade slides into must be fitted to the inside of the fender with screws or rivets.
    - Tire Sidewall Shades require no mounting hardware that place holes in the vehicle

SUMMARY OF THE INVENTION

The Tire Sidewall Shade is a custom sized tire shade that is held to the sidewall of a tire by specifically sized U.V. rated shock or bungee cord which is attached to the spring wire frame of the tire shade fabric. The bungee harness is secured with D-Rings and clips which are removable for replacement or adjustment of the bungee tension. The bungee cord is an ultraviolet rated cord, and the Tire Sidewall Shade fabric is a marine type fabric which is also U.V. rated. An additional fabric layer of an alternate color is affixed to the rear of the tire shade. This is incorporated to the Tire Sidewall Shade for the purpose of diminishing heat buildup from any possible focused light to the back of the shade from a highly polished rim, i.e.: a deep aluminum or chrome rim. That additional fabric is extended marginally past the initial fabrics interior lip to create a unique aesthetic embellishment to the Tire Sidewall Shade which is visible on the outside facing portion of the shade. The Tire Sidewall Shade can also be altered to allow for protection of the wheel itself if requested before fabrication by retaining the interior shade material.

The Tire Sidewall Shade shading device incorporates several unique features compared to other available devices currently in the market. This invention is innovative, useful, and very unique in its features and aesthetic value. The purpose of this tire and wheel shading device is to eliminate U.V. deterioration of the tire sidewall when the vehicle is parked. Most importantly this design solves several of the issues with commonly marketed tire shades. In an attempt to not only improve the function over current shade products, our Tire Sidewall Shade System also advances the desired aesthetic value over all other products by way of the unique features incorporated into this design.
- Tire Sidewall Shade Design Benefits:
    1. Custom fitted to the specific tire size
    2. Aesthetically pleasing
    3. Twist and fold into a small lightweight package for storage
    4. Manufactured with UV rated Marine Fabric
    5. Mold resistant
    6. Will not hold moisture on the tire or rim
    7. Fastened to the tire so it will not expose any portion of the sidewall when the motorhome is leveled 8. The center of the shade is open to the dimension of the rim which exposes the chrome of aluminum wheel, this is cosmetically superior to all other designs and when installed looks like the tire itself.

9. Allows air flow around the tire and rim

10. Cost effective with no holes or permanent damage to the paint

11. Stores by collapsing to one third (⅓) its' original size

12. Center of the shade can be adjusted by request to provide U.V. protection for the wheel itself.

DETAILED DESCRIPTION

Certain exemplary embodiments of the present invention are described below and are illustrated in the accompanying figures. The embodiments described are only for purposes of illustrating the present invention and should not be interpreted as limiting the scope of the invention, which is limited only by the claims below. Other embodiments of the invention, and certain modifications and improvements of the described embodiments, will occur to those skilled in the art and all such alternate embodiments, modifications, and improvements are within the scope of the present invention. The description contains the steps for the creation of the Tire Sidewall Shade, as well as for its attachment to the tire and later collapse for storage.

As is common practice, the various features of the figures discussed below are not necessarily drawn to exact scale. Dimensions of those features and elements of the figures may have been expanded or reduced to illustrate the embodiment of the invention more clearly.

Figure 2:
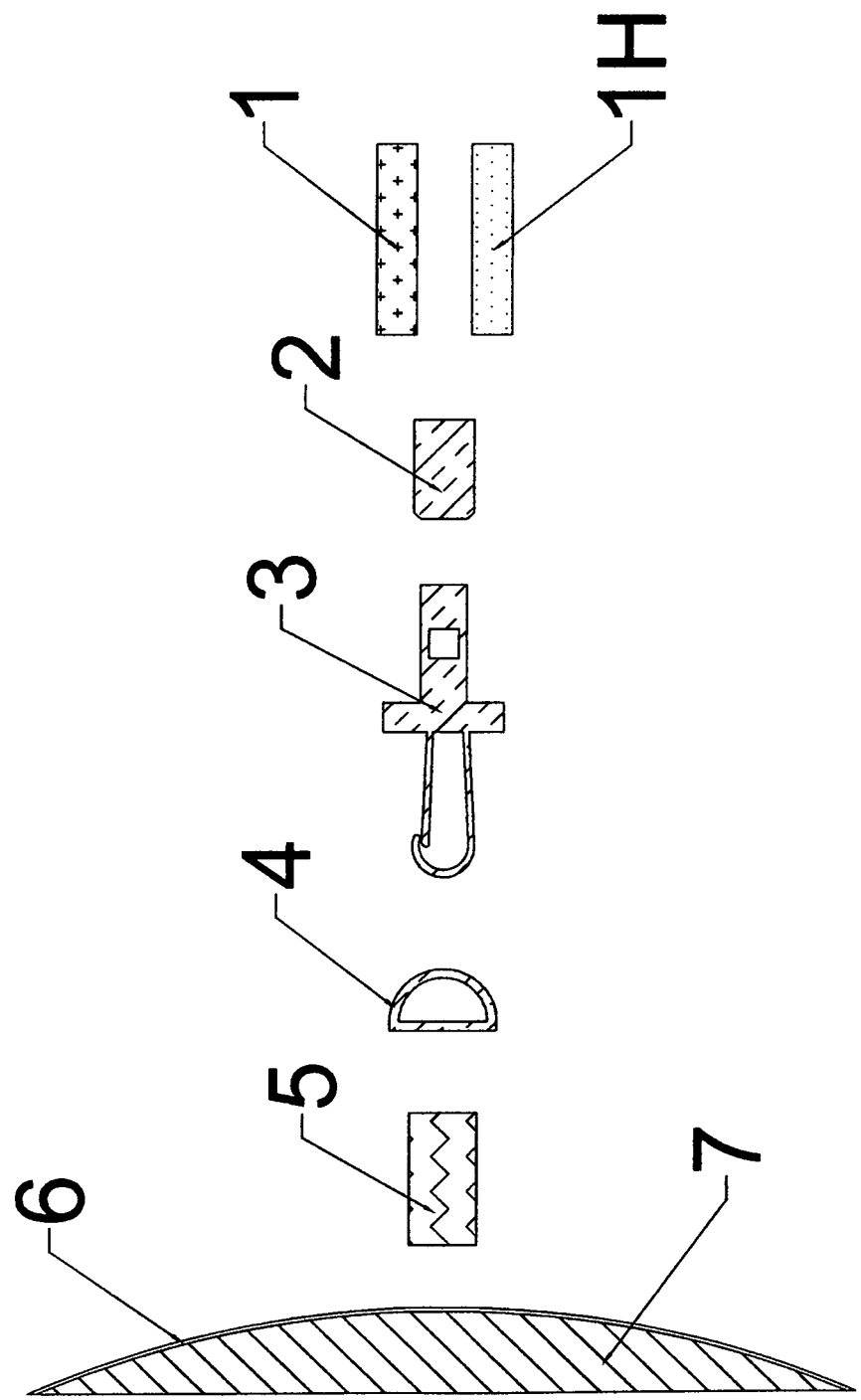
Figure 3:
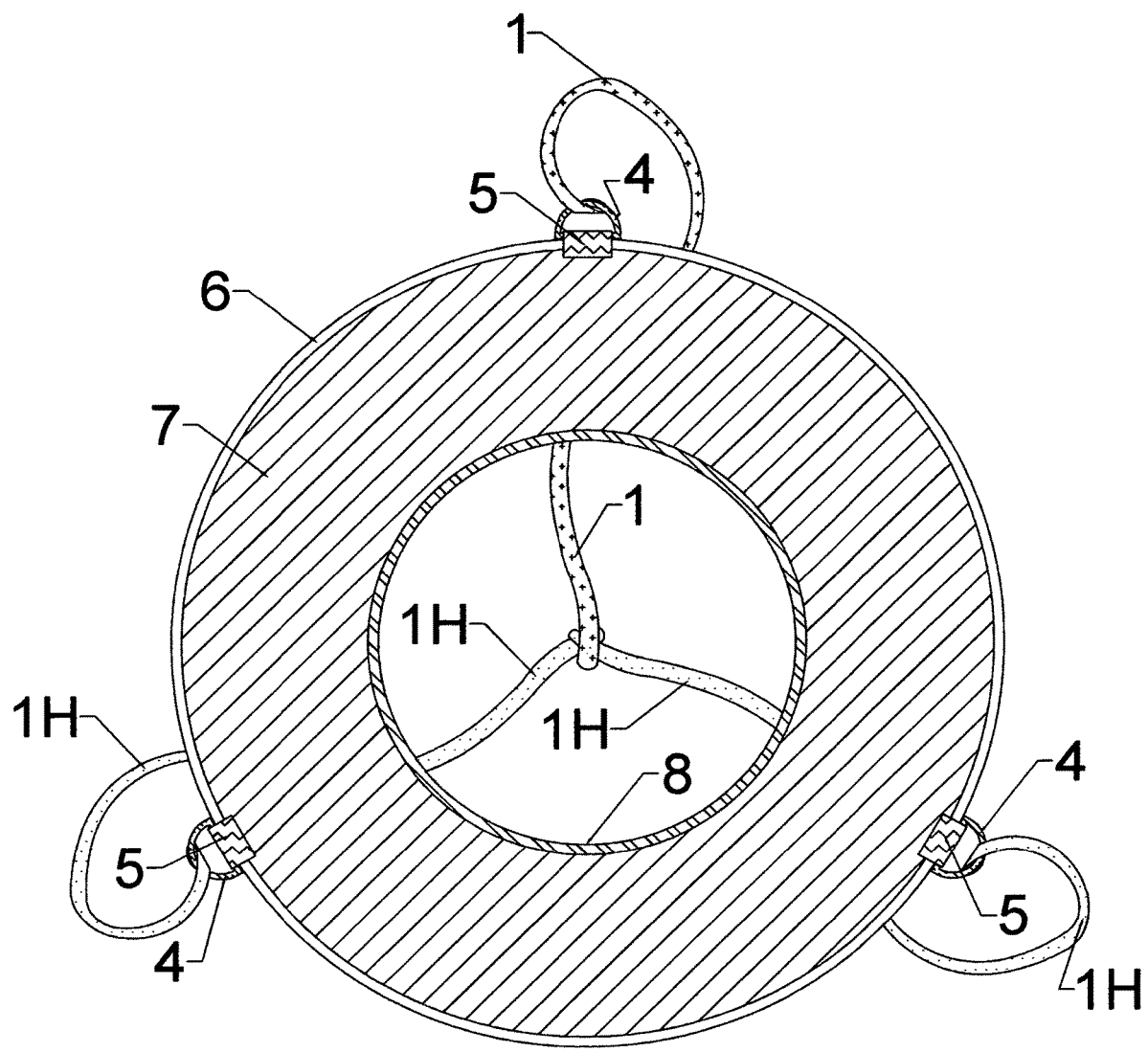
FIG. 3. Illustrates the completed Tire Sidewall Shade and components (not installed on tire). Bungee cord 1, 1H, D-Ring 4, Fabric strap 5, Spring wire frame in hem 6, Tire shade fabric 7, Alternate Color Fabric 8
Figure 4:
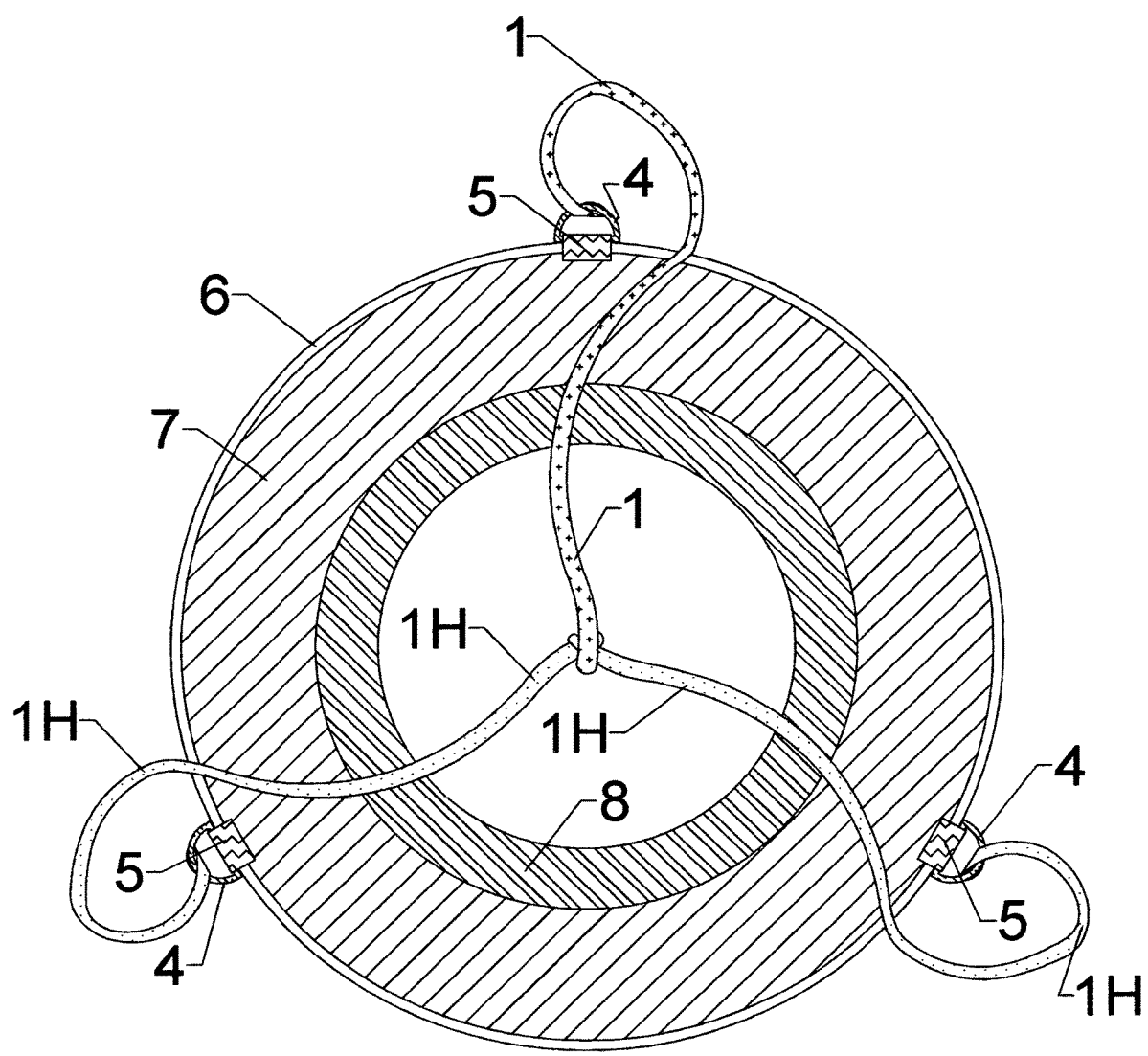
FIG. 4. Illustrates the back or tire side of the Tire Sidewall Shade (not installed on tire). Bungee 1, 1H, D-Ring 4, Fabric Strap 5, Spring wire frame in hem 6, Tire Shade Fabric 7, Alternate color fabric 8.

A spring wire frame is fabricated to a specific length in regards to the specific advertised diameter of a particular tire. Once cut to the proper length the spring wire is then crimped in a hydraulic press to maintain a circular shape to the advertised diameter of the particular tire it is intended for. FIGS. 2, 3, and 4 show this frame labeled as (6). The fabric for the tire shade, labeled (7), is cut in a circle so that the outside diameter is slightly larger than the wire frame (6), allowing the fabric to be folded over the wire frame and then sewn into the hem which will then contain the wire frame (6), see FIG. 2. Once sewn into place the fabric is then held under slight tension. The center opening is then cut to a specific circular dimension based on the wheel size i.e.: a wheel or rim may have a diameter of 19.5", which would require the center opening to be trimmed to a slightly smaller diameter in order to accommodate a stitched edge in order to finish the fabric hem. The center opening can be seen in FIGS. 1, 3 and 4. As shown in FIGS. 2, 3, and 4 once these steps are taken, 3 strips of fabric (5) will be used to sew the D-Rings (4) into their respective locations, usually but not limited to a 8-12- and 4 o'clock position. The Tire Sidewall Shade, nearly complete, then receives a circular light-colored fabric (8) which is sewn to the back of the shade perimeter. The inside diameter of the rear fabric (8) portion is of a slightly smaller diameter of the finished tire shade fabric (7), this creates an aesthetic value by showing a thin alternate colored edge when viewing the shade in the installed position, this can be seen in FIGS. 1 and 3. Finally, three U.V. rated bungee cords (1 & 111) are cut to length specific to the tire it is fabricated for and also allowing for the specific stretch value of the bungee, (this ensures the proper tension of the shade material to the sidewall of the tire), they can be seen in FIGS. 1 through 5. The longer cord (1H) will span the 8 o'clock and 4 o'clock positions, shorter cord (1) at the 12 o'clock position will be joined to the center of the horizontal bungee (1H) by tying a knot. The final step is to attach the clips (3) to the bungees (1 & 1H), this is accomplished by first inserting a locking collar (2) over the end of the bungee (I & III), then sliding the bungee cord end into the clip (3), the locking collar (2) is then pushed up and onto the clip base where it is now locked onto the bungee cords, the clip (3) is then attached to the installed D-ring (4) that has been previously sewn to the perimeter of the Tire Sidewall Shade, this entire assemblage is illustrated in FIG. 2.

Figure 1:
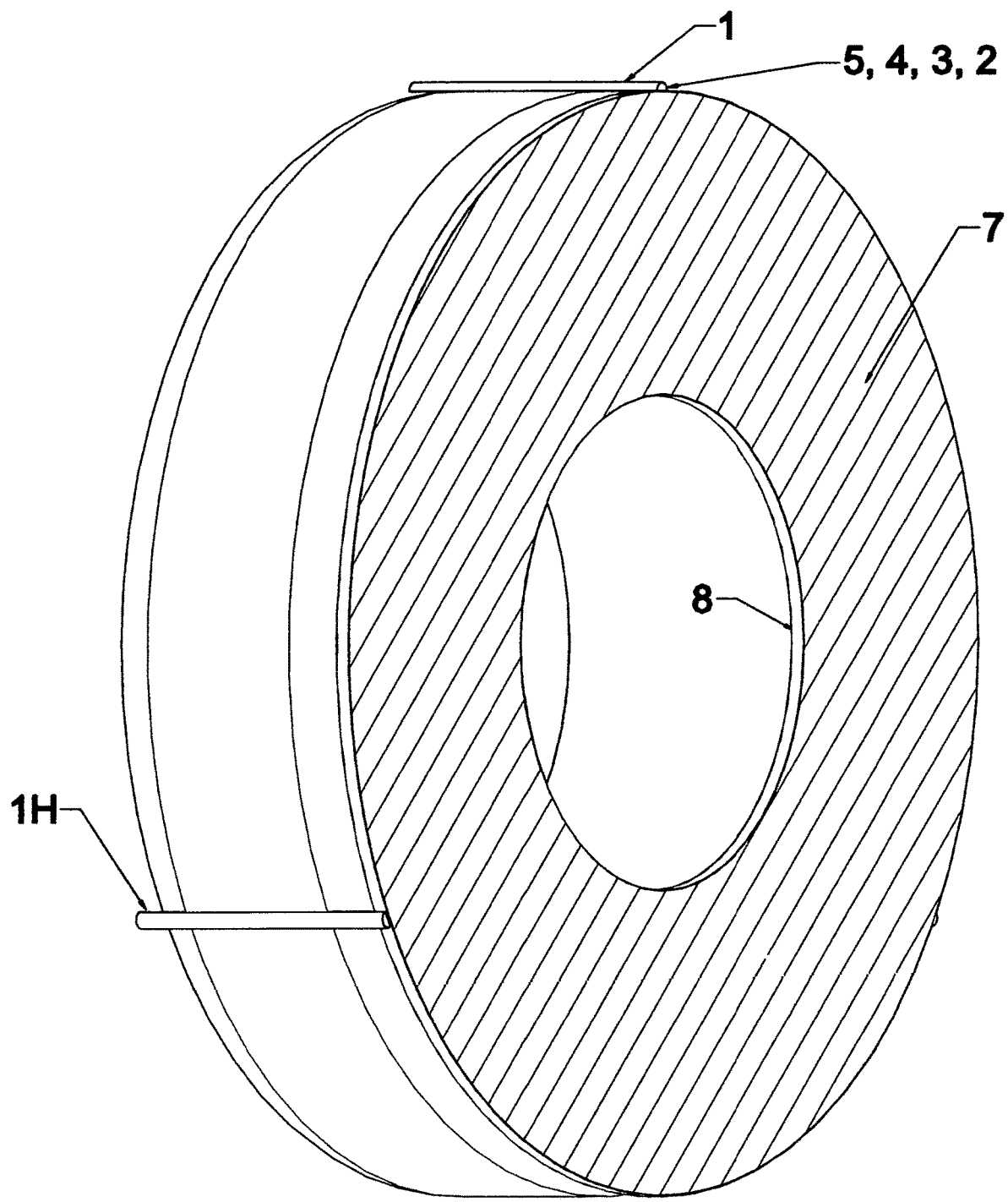
FIG. 1. The Tire Sidewall Shade shown in its installed and completed form on a tire FIG. 2. The assembly sequence of the Bungee 1, 1H, Locking Collar 2, Clip 3, D-Ring 4, Fabric attaching piece 5, Spring wire frame 6, Tire shade fabric 7.
Figure 5:
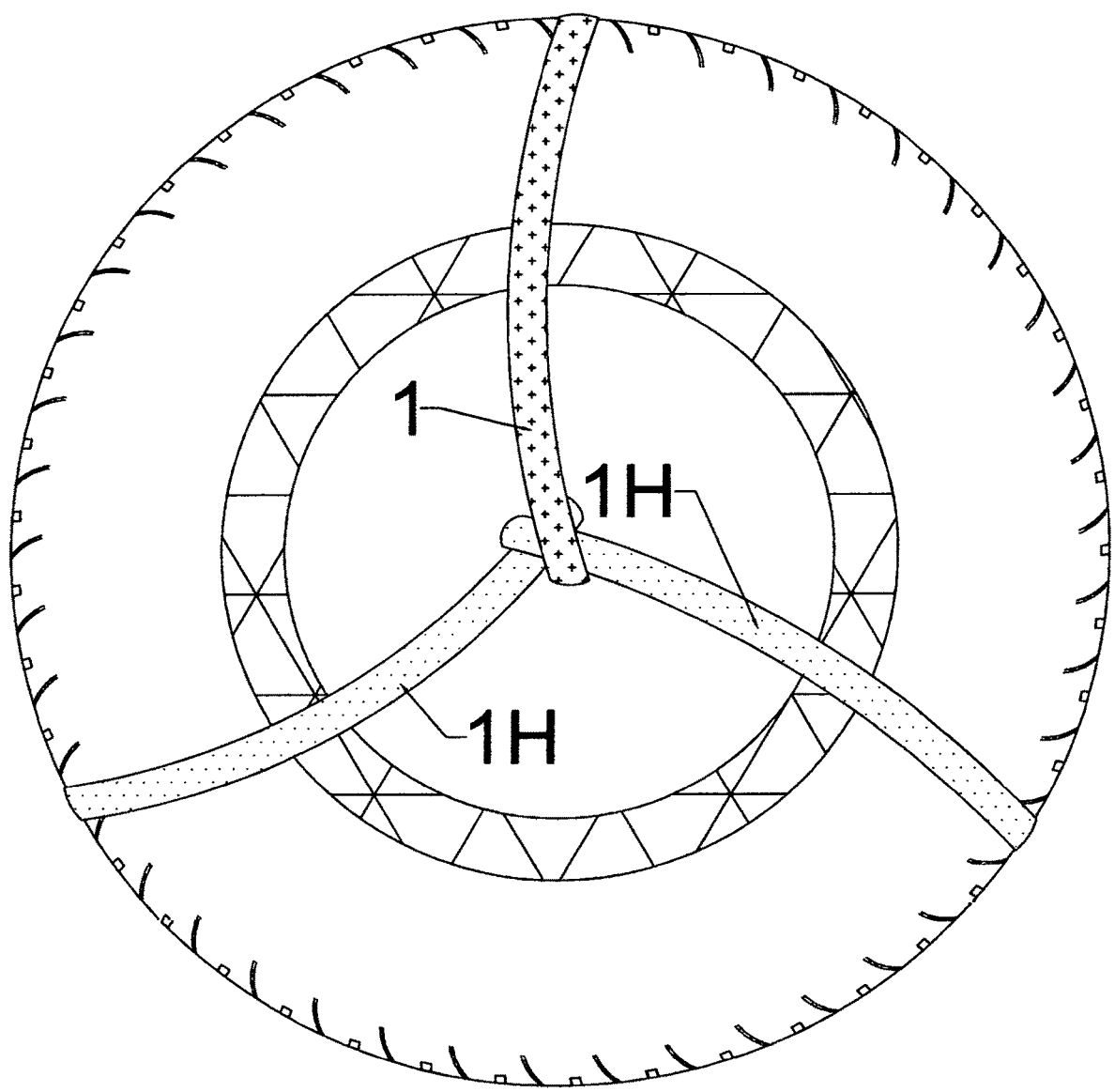
FIG. 5. Illustrates the back of the tire with the Tire Sidewall Shade installed. Bungee 1,1H

To install the completed Tire Sidewall Shade, the bungee harness (1 & 1H) is stretched over the top of the tire and the side bungees (1H) are pulled down on the front and rear of the tire at a 45-degree angle, shown in FIGS. 1 and 5, the resulting tension pulls the tensioned shaded fabric to the tire and holds it securely. Removal of the shade is the reverse. Once removed the Tire Sidewall Shade cover can be folded for storage by twisting, thanks to an interior semi-rigid and flexible wire (6) incorporated into the perimeter of the Tire Sidewall Shade. This twisting fold reduces the shades down to roughly ⅓ of their original size, allowing them to be stored in a provided storage bag. The twisted fold also creates a structure in which the long bungee harness cords (1H) can be internally stored, while the short bungee cord (1) can be used as a band, to further secure the Tire Sidewall Shade for storage.

What is claimed is:

1. A tire sidewall shading device comprising:
   a shaped outside perimeter frame feature;
   a shaped first fabric having a first front surface and a first rear surface, a major outer dimension and a minor inner dimension wherein the major outer dimension is fitted, tensioned and permanently secured over the outside perimeter frame feature forming a hem that captures the outside perimeter frame feature and wherein the minor inner dimension is less than an major outer dimension, creating a center opening;
   a second shaped fabric having a second front surface and a second rear surface, sized to a dimension that is less than or equal to the-major outer dimension of the first fabric;
   wherein the second rear surface of the second fabric is fitted to cover the first rear surface of the first fabric;
   at least three fabric attachment strip features, secured and equally spaced apart from one another about the outside perimeter frame feature;
   an attachment ring or D-ring secured to an end portion of each of the at least three fabric attachment strip features, resulting in at least three attachment rings; and at least one elasticized cord releasably secured to each of the at least three attachment rings, resulting in at least three elasticized cords, each releasably secured at a first end to each of the at least three attachment rings and each of the at least three elasticized cords are secured to one another at a second end, wherein the secured ends of the at least three elasticized cords are adjustably tensionable to secure the tire sidewall shading device by wrapping around an interior side of a vehicle tire, wherein the first and second fabric are positioned on the opposite exterior side of the vehicle tire.

2. The tire sidewall shading device of claim 1, wherein the shaped outside perimeter frame feature dimension is sized to fit a vehicle tire outside diameter.

3. The tire sidewall shading device of claim 1, wherein the shaped outside perimeter frame feature comprises a spring wire having flexible properties.

4. The tire sidewall shading device of claim 1, wherein the shaped first fabric is a U.V. light-blocking fabric.

5. The tire sidewall shading device of claim 1, wherein the shaped second fabric is a different color than the first fabric.

6. The tire sidewall shading device of claim 1, wherein the shaped second fabric comprises a heat diminishing color capable of reflecting focal light.

7. The tire sidewall shading device of claim 1, wherein the shaped second fabric comprises a color shade of white.

8. The tire sidewall shading device of claim 1, wherein the at least three elasticized cords are U.V.-rated.

9. The tire sidewall shading device of claim 1, wherein each elasticized cord is removably secured to each of the at least three attachment rings with a clip feature.

10. The tire sidewall shading device of claim 1, wherein the first front surface of the first fabric is configured to face outward and away from an exterior sidewall of a tire, and the second front surface of the second fabric is configured to face inward, adjacent to the exterior sidewall of the tire.

11. The tire sidewall shading device of claim 1, wherein the at least three elasticized cords are configured to stretch over a vehicle tire mounted to a vehicle, and securely tensioned on an interior side of the vehicle tire, such that the first shaped U.V. fabric is facing away from an exterior facing surface of the vehicle tire and the second shaped fabric is adjacent to the sidewall of the exterior facing surface of the vehicle tire.

12. The tire sidewall shading device of claim 1, wherein two of the at least three elasticized cords are longer than the at least third elasticized cord.

13. The tire sidewall shading device of claim 1, wherein the first fabric is a marine type fabric.

14. The tire sidewall shading device of claim 1, wherein the second fabric is a marine type fabric.

15. The tire sidewall shading device of claim 1, wherein the second fabric is a U.V. light-blocking fabric.

16. The tire sidewall shading device of claim 1, wherein the second fabric does not have a center opening.

17. A tire sidewall shading device comprising:
a spring wire frame configured to be retained around the perimeter of a tire;
a shaped first fabric secured to the spring wire frame, the shaped first fabric having a center opening for accessing a wheel;
a second shaped fabric secured to a side of the shaped first fabric, the second shaped fabric sized to a dimension that is less than or equal to an outside perimeter of the shaped first fabric and a dimension that is less than the dimension of the center opening;
at least three attachment features, secured equidistant from one another about the perimeter of the spring wire frame, each of the at least three attachment features comprising an end portion configured to secure an attachment ring thereto, resulting in at least three attachment rings;
at least one of three elasticized cords each releasably secured to each of the at least three attachment rings, the at least one of the three elasticized cords each adjustably tensionable to secure the tire sidewall shading device and prevent U.V. light from contacting the tire sidewall.

18. The tire sidewall shading device of claim 17, wherein the shaped first fabric is a U.V. light-blocking fabric.

19. The tire sidewall shading device of claim 17, wherein the shaped second fabric is a different color than the first fabric.

20. The tire sidewall shading device of claim 17, wherein the shaped second fabric comprises a heat diminishing color capable of reflecting focal light.

21. A tire sidewall shading device comprising:
a spring wire frame configured to be retained around the perimeter of a tire to protect the sidewalls of the tire from degradation;
an annular shaped first fabric having a major outer dimension and a minor inner dimension wherein the major outer dimension is fitted, tensioned, and permanently secured over the spring wire frame and sewn into a hem securing the wire frame, the shaped first fabric wherein the minor inner dimension provides a center opening for accessing a wheel, the annular shaped first fabric capable of blocking U.V. light;
a second shaped fabric, fitted and secured to one side of the first shaped fabric, sized to a dimension that is less than or equal to the major outer dimension of the first shaped fabric and a minor inner diameter less than the minor inner dimension of the first shaped fabric, the second shaped fabric capable of blocking U.V. light;
wherein the inside diameter of second fabric forms an aesthetic alternate colored edge adjacent to the minor inner dimension of the first fabric;
at least three fabric attachment strip features, secured equidistant from one another about the spring wire frame;
at least three attachment rings, one each secured to an end portion of each of the at least three fabric attachment strip features; and
at least three elasticized cords, one each releasably secured to each of the at least three attachment rings at a first end and each of the at least three elasticized cords are secured to one another at a second end,
wherein the secured ends of the at least three elasticized cords are adjustably tensionable to secure the tire sidewall shading device by wrapping around an interior side of a vehicle tire, wherein the first and second fabric are positioned on the opposite exterior side of the vehicle tire to block U.V. light from contacting the tire, while permitting access to the wheel.

22. The tire sidewall shading device of claim 1, wherein the second fabric comprises an inside dimension less than the minor inner dimension of the first fabric, forming a smaller center opening and wherein the smaller center opening of the second fabric forms an aesthetic alternate colored edge adjacent to the minor inner dimension of the first fabric.

* * * * *